United States Patent
Moss et al.

(10) Patent No.: US 11,526,547 B2
(45) Date of Patent: Dec. 13, 2022

(54) MULTI-INPUT PLAYLIST SELECTION

(71) Applicant: iHeartMedia Management Services, Inc., San Antonio, TX (US)

(72) Inventors: Michael Moss, Hoboken, NJ (US); Pablo M. Calamera, New York, NY (US); Ryan R. Sult, Fairfield, CT (US); Lasse Hamre, New York, NY (US); Steven F. Radley, Yonkers, NY (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 90 days.

(21) Appl. No.: 16/404,486

(22) Filed: May 6, 2019

(65) Prior Publication Data

US 2019/0258669 A1   Aug. 22, 2019

Related U.S. Application Data

(63) Continuation of application No. 15/145,552, filed on May 3, 2016, now Pat. No. 10,318,651, which is a
(Continued)

(51) Int. Cl.
*G06F 16/635* (2019.01)
*G06F 16/68* (2019.01)
(Continued)

(52) U.S. Cl.
CPC ...... *G06F 16/635* (2019.01); *G06F 16/24578* (2019.01); *G06F 16/639* (2019.01); *G06F 16/68* (2019.01); *H04L 65/60* (2013.01)

(58) Field of Classification Search
CPC .............................. G06F 16/365; G06F 16/639
See application file for complete search history.

(56) References Cited

U.S. PATENT DOCUMENTS

| | | |
|---|---|---|
| 5,297,183 A | 3/1994 | Bareis et al. |
| 6,526,411 B1 | 2/2003 | Ward |

(Continued)

FOREIGN PATENT DOCUMENTS

| | | |
|---|---|---|
| CA | 2667573 A1 | 5/2008 |
| CA | 2672437 A1 | 6/2008 |

(Continued)

OTHER PUBLICATIONS

Office Action received for European Patent Application No. 13836155.5, dated Feb. 6, 2018, 8 pages.
(Continued)

*Primary Examiner* — William Spieler
(74) *Attorney, Agent, or Firm* — Garlick & Markison; Edward J. Marshall

(57) ABSTRACT

A device includes a processor that is configured to identify a base topic of a personalized media stream and to identify a first media item based on first data. The first data is assigned a first weighting based on an identified level of familiarity associated with the first media item and an identified level of popularity of the first media item in another personalized media stream. The processor is configured to build a collection of candidate media items that includes the first media item and a second media item and to order the collection of candidate media items to form the personalized media stream. Ordering the collection includes ordering the first media item within the collection based on the first weighting. The processor is configured to initiate transmission of the first media item to a client device for playback based on ordering of the first media item within the collection.

11 Claims, 6 Drawing Sheets

Related U.S. Application Data continuation of application No. 13/759,540, filed on Feb. 5, 2013, now Pat. No. 9,355,174.

(60) Provisional application No. 61/698,566, filed on Sep. 7, 2012.

(51) Int. Cl.
 G06F 16/638 (2019.01)
 G06F 16/2457 (2019.01)
 H04L 65/60 (2022.01)

(56) References Cited

U.S. PATENT DOCUMENTS

| | | |
|---|---|---|
| 6,546,427 B1 | 4/2003 | Ehrlich et al. |
| 7,353,000 B2 | 4/2008 | Morgan |
| 7,415,430 B2 | 8/2008 | Christensen et al. |
| 7,522,895 B2 | 4/2009 | Morgan |
| 7,532,621 B2 | 5/2009 | Birman et al. |
| 7,685,132 B2 | 3/2010 | Hyman |
| 7,725,492 B2 | 5/2010 | Sittig et al. |
| 7,747,446 B2 | 6/2010 | Blass et al. |
| 7,772,478 B2 | 8/2010 | Whitman et al. |
| 7,773,939 B2 | 8/2010 | Christensen et al. |
| 7,827,208 B2 | 11/2010 | Bosworth et al. |
| 7,945,653 B2 | 5/2011 | Zuckerberg et al. |
| 7,949,649 B2 | 5/2011 | Whitman |
| 7,949,707 B2 | 5/2011 | Mcdowall et al. |
| 7,953,599 B2 | 5/2011 | Greene et al. |
| 7,979,442 B2 | 7/2011 | Hyman |
| 8,060,227 B2 | 11/2011 | Stefik |
| 8,073,854 B2 | 12/2011 | Whitman et al. |
| 8,081,817 B2 | 12/2011 | Tedesco et al. |
| 8,099,433 B2 | 1/2012 | Sittig et al. |
| 8,260,230 B2 | 9/2012 | Zigler et al. |
| 2002/0010621 A1 | 1/2002 | Bell et al. |
| 2002/0019858 A1 | 2/2002 | Kaiser et al. |
| 2002/0023021 A1 | 2/2002 | De Souza |
| 2002/0073171 A1 | 6/2002 | McDowall et al. |
| 2002/0078056 A1* | 6/2002 | Hunt ............... G06F 16/9535 |
| 2003/0014407 A1* | 1/2003 | Blatter ............... G06Q 30/02 |
| 2003/0135513 A1 | 7/2003 | Quinn et al. |
| 2003/0221541 A1 | 12/2003 | Platt |
| 2004/0034711 A1* | 2/2004 | Hughes ............... H04L 65/4092 |
| | | 709/231 |
| 2006/0085383 A1 | 4/2006 | Mantle et al. |
| 2006/0265421 A1 | 11/2006 | Ranasinghe et al. |
| 2007/0025194 A1 | 2/2007 | Morse et al. |
| 2007/0085840 A1 | 4/2007 | Asaka et al. |
| 2007/0203790 A1* | 8/2007 | Torrens ............... G06F 16/24 |
| | | 705/14.69 |
| 2007/0220025 A1 | 9/2007 | Hyman |
| 2007/0220081 A1 | 9/2007 | Hyman |
| 2008/0155470 A1 | 6/2008 | Khedouri et al. |
| 2008/0156173 A1 | 7/2008 | Bauer |
| 2008/0162147 A1 | 7/2008 | Bauer |
| 2008/0162570 A1 | 7/2008 | Kindig et al. |
| 2008/0215645 A1 | 9/2008 | Kindig et al. |
| 2008/0222546 A1 | 9/2008 | Mudd et al. |
| 2008/0261512 A1 | 10/2008 | Milbrandt et al. |
| 2008/0263098 A1 | 10/2008 | Kindig |
| 2008/0281867 A1 | 11/2008 | Kendall et al. |
| 2008/0305736 A1 | 12/2008 | Milbrandt et al. |
| 2009/0019174 A1 | 1/2009 | Ehn et al. |
| 2009/0056525 A1* | 3/2009 | Oppenheimer ..... G06F 16/639 |
| | | 84/609 |
| 2009/0113300 A1 | 4/2009 | Tuli |
| 2009/0138505 A1 | 5/2009 | Purdy |
| 2009/0144392 A1 | 6/2009 | Wang et al. |
| 2009/0164473 A1 | 6/2009 | Bauer |
| 2009/0164514 A1 | 6/2009 | Svendsen et al. |
| 2009/0164516 A1 | 6/2009 | Svendsen et al. |
| 2009/0199229 A1 | 8/2009 | Gupta et al. |
| 2009/0327193 A1* | 12/2009 | Eronen ............... G06Q 10/00 |
| | | 706/47 |
| 2010/0023399 A1 | 1/2010 | Sahni et al. |
| 2010/0049852 A1 | 2/2010 | Whitnah et al. |
| 2010/0088312 A1 | 4/2010 | Goldfeder |
| 2010/0106852 A1 | 4/2010 | Kindig et al. |
| 2010/0142521 A1 | 6/2010 | Evans et al. |
| 2010/0146135 A1 | 6/2010 | Evans et al. |
| 2010/0185625 A1 | 7/2010 | Johnson et al. |
| 2010/0228740 A1 | 9/2010 | Cannistraro et al. |
| 2011/0029928 A1 | 2/2011 | Bachman et al. |
| 2011/0225150 A1 | 9/2011 | Whitman |
| 2011/0251902 A1 | 10/2011 | Nagarajayya |
| 2011/0258383 A1 | 10/2011 | Niemela et al. |
| 2012/0013548 A1 | 1/2012 | Choi et al. |
| 2012/0016678 A1 | 1/2012 | Gruber et al. |
| 2012/0022872 A1 | 1/2012 | Gruber et al. |
| 2012/0023405 A1 | 1/2012 | Hyman |
| 2012/0066593 A1 | 3/2012 | Schneider |
| 2012/0096011 A1* | 4/2012 | Kay ............... G06F 16/635 |
| | | 707/748 |
| 2012/0191506 A1 | 7/2012 | Tavares et al. |
| 2013/0191857 A1* | 7/2013 | Guinn ............... G06F 3/16 |
| | | 725/24 |
| 2013/0318079 A1* | 11/2013 | Kindel ............... G06F 16/358 |
| | | 707/728 |
| 2014/0114966 A1 | 4/2014 | Bilinski et al. |

FOREIGN PATENT DOCUMENTS

| | | |
|---|---|---|
| CA | 2680281 A1 | 9/2008 |
| CA | 2680797 A1 | 9/2008 |
| EP | 2015542 A1 | 1/2009 |
| EP | 1807773 B1 | 1/2010 |
| EP | 2163434 A2 | 3/2010 |
| EP | 2302634 A2 | 3/2011 |
| EP | 2378435 A1 | 10/2011 |
| EP | 2388954 A1 | 11/2011 |
| EP | 1939880 B1 | 8/2012 |
| KR | 10-2010-0007095 A | 1/2010 |
| KR | 10-2010-0007102 U | 1/2010 |
| KR | 10-2010-0007108 A | 1/2010 |
| KR | 10-2010-0056430 A | 5/2010 |
| KR | 10-1002731 B1 | 12/2010 |
| KR | 10-1002732 B1 | 12/2010 |
| WO | 2006/048046 A1 | 5/2006 |
| WO | 2007/076150 A2 | 7/2007 |
| WO | 2008/006068 A2 | 1/2008 |
| WO | 2008/021097 A2 | 2/2008 |
| WO | 2008/052050 A2 | 5/2008 |
| WO | 2008/073992 A2 | 6/2008 |
| WO | 2008/101227 A1 | 8/2008 |
| WO | 2008/105766 A1 | 9/2008 |
| WO | 2008/105776 A2 | 9/2008 |
| WO | 2008/106562 A2 | 9/2008 |
| WO | 2008/106624 A2 | 9/2008 |
| WO | 2008/109889 A1 | 9/2008 |
| WO | 2008/112924 A2 | 9/2008 |
| WO | 2008/113033 A1 | 9/2008 |
| WO | 2008/122072 A1 | 10/2008 |
| WO | 2008/154648 A1 | 12/2008 |
| WO | 2009/053831 A2 | 4/2009 |
| WO | 2009/055825 A1 | 4/2009 |
| WO | 2010/021835 A1 | 2/2010 |
| WO | 2010/021862 A1 | 2/2010 |
| WO | 2010/101851 A1 | 9/2010 |
| WO | 2011/078975 A1 | 6/2011 |
| WO | 2011/097624 A2 | 8/2011 |
| WO | 2011/133402 A1 | 10/2011 |
| WO | 2012/003255 A2 | 1/2012 |

OTHER PUBLICATIONS

International Search Report and Written Opinion received for PCT Patent Application No. PCT/US13/58571, dated Feb. 7, 2014, 7 pages.

International Preliminary Report on Patentability received for PCT Patent Application No. PCT/US13/58571, dated Mar. 19, 2015, 7 pages.

(56) References Cited

OTHER PUBLICATIONS

European Search Report and Search Opinion Received for EP Application No. 13836155.5, dated Aug. 9, 2016, 9 pages.

\* cited by examiner

MULTI-INPUT PLAYLIST SELECTION

CROSS-REFERENCE TO RELATED APPLICATIONS

The present application claims priority from and is a continuation application of U.S. Non-Provisional patent application Ser. No. 15/145,552, filed May 3, 2016, and entitled "MULTI-INPUT PLAYLIST SELECTION," which claims priority to and is a continuation of U.S. Non-Provisional patent application Ser. No. 13/759,540, filed Feb. 5, 2013 and entitled "MULTI-INPUT PLAYLIST SELECTION," which claims priority to U.S. Provisional Application No. 61/698,566, filed Sep. 7, 2012, and entitled "MULTI-INPUT PLAYLIST SELECTION," the contents of each of which are incorporated herein by reference in their entirety.

TECHNICAL FIELD

The present disclosure relates to streaming media such as on-line music stations that target selected content to user characteristics.

BACKGROUND

Traditional broadcast radio is simple. A listener can tune into a radio station that matches the general tastes of the listener. For example, a user who likes rap music may tune to a radio station that plays rap music. However, even if the user is in a mood for rap music, the traditional broadcast station may not be playing songs that the user wants to listen to. For example, the user may want light rhythm and blues (R&B), and the station may be playing heavy rap. As another example, the station may be playing music from a light R&B group that the user does not like.

On-line streaming of media, such as by internet radio stations, may enable content to be targeted more closely to a user's preferences than traditional broadcast approaches. For example, at the beginning of a listening session, a user of a streaming media service can identify a style of music, a song, or an artist, and the streaming media service may play a list of songs that are matched to such a user input. Such a user input may be used by the service as a station identifier and may be saved so that the user can select it during later listening sessions in order to be played similar music. For example, if a user enters the term "REM," a service may select 90s music and light rock from other decades, such as by using data that indicates similarities between artist or styles or songs (i.e., data that indicates that certain songs are similar to songs by the group R.E.M.). When the user starts a subsequent listening session, the user may be presented with multiple stations, such as a "light alt rock" or "R.E.M." station, and can readily select such an option to again listen to such type of music.

SUMMARY

Systems and techniques are disclosed by which a digital personalized media streaming service may select and order items, such as songs, to be played to a listener. One feature of an example service is the ability to create custom radio stations. A custom radio station may correspond to a stream of audio items, such as songs, that are directed to a user, a particular topic expressed by the user, or a particular interest that is identified for the user. The stream of audio items may be punctuated by short advertisements, audio bumpers, and/or other such material. The user may be identified by a user account into which a device for playing the station is logged. Such stations may be created, for example, either from a list of search results for an artist or song, or from a live simulcast or digital-only terrestrial radio stream ("live radio stream"). Artist and song identifiers (IDs), such as names or unique numbers that identify the respective artists or songs, can be returned for each search result and are generally present in the metadata of such a live radio stream. For example, a user may type a query like "folk," and a system may return a list of artists previously identified as artists that focus on folk music. The user may then select one of the artists to serve as a "seed" for a streaming music radio station, where subsequent songs are selected by the system to match the selected artist in style or other characteristics. Similarly, a user who is listening to a live radio stream (either through the interne or over the air, such as in a digital broadcast that is accompanied by metadata about songs that are played) may make a selection to indicate a preference (e.g., a positive feedback) for a particular song. A system may then save metadata about the song for later use, or may use such metadata immediately to switch the user to a personalized radio station that is seeded with the song that was playing when the user made the selection.

Given an initiating identifier (ID) or other similar starting input as a seed, the example service can build and retrieve a relevant song playlist based on a process that incorporates multi-source vendor and internal data, can shuffle the play order to maintain digital millennium copyright act (DMCA) compliance, and can play the station for the listener—e.g., on an internet-connected media device of the listener (e.g., a car radio, a personal computer (PC) application, a desktop radio, a digital stereo receiver, a tablet computer, or a smartphone).

As discussed in more detail below, the example service uses multi-source data (i.e., data of distinct different types, and not just different values of the same type, and from different organizations) to construct a process that blends similarity and popularity data that generates a custom radio service more tailored to a particular listener. Each data point used in the process can be weighted according to (a) its level of influence in producing a desirable listener experience and (b) the integrity of its source. Overrides can be applied where the process cannot produce desired results—e.g., where a check is made on a proposed playlist and indicates that the proposed playlist is non-preferable for some reason external to the selection process, and the process then fixes such a problem.

For example, data may be received from a first service (source A) that characterizes the relationships between particular different artists or particular different songs. Any particular artist or song may be considered a "seed," and the identified related artists or songs may be considered to be "children" of the seed artist or song. The relationships between songs, between artists, and between artists and songs may be expressed in a graph. Particular artists and particular songs may correspond to nodes of the graphs. Relationships among artists and songs may correspond to edges between the nodes. Such similarity may be determined, for example, by multiple independent mechanisms that are then combined in a properly-weighted manner. As one example, data that characterizes popularity of artists and songs, and relationships between artists, songs, and genres, may be scraped from various web pages. For example, two artists that are discussed on a single web page, to the exclusion of other artists, may be inferred to relate to each other in a relevant way (and such correlation across many web pages may increase the weight of that identified correlation).

Separately, the system may obtain data about artists and songs from a third-party organization (source B) that employs human editors to manually characterize (and perhaps partially automatically categorize, e.g., by analyzing beats per minute, and average amplitude of songs) the songs or artists by a variety of parameters. The strength of the former set of data (from source A) is its extensive reach, even to rare and unknown artists and songs (because the reach of the web is so massive). The weakness of the former set of data (from source A) is its lack of accuracy in many situations, its failure to capture musical relationships accurately (e.g., two singers may be discussed together on many web pages because they are dating, and not because their music is similar), and its lack of in-depth data for the most popular artists (as compared to a human-based system that can go into great depth in characterizing the most popular artists and songs). The strength of the latter group of data (from source B) is its tight connection to the characteristics of the particular songs or artists, large amounts of relevant data on the most popular artists and songs, and its overall accuracy. But the weaknesses of the latter group of data (from source B) include its failure to cover rare artists and songs (it does not have a long tail depth) and potential bias from being formed by an editorial team that may have limited diversity or a biased musical perspective.

Thus, a hybrid model for defining relationships between and among artists and/or songs—which takes into account data from such different categories of sources—can produce a culturally relevant set of artist-to-artist associations so as to have a long tail, with purified associations for the most popular artists. Though a two-way or two-source hybrid has been described for purposes of clarity, other multi-way (3 or more) combinations may be used. For example, a process for selecting and ordering songs in a playlist may also consider levels of recent radio airplay on terrestrial radio broadcast stations. The blending of such multi-source input signals to generate a playlist may be selected as weighting factors based on manual observations, heuristic rules, and/or machine learning expert system techniques, such as by training a system on various such inputs and correlating such inputs to user survey responses or user "thumbs up" and "thumbs down" selections.

In a particular aspect, a computer-implemented process is disclosed. The process includes identifying, by a computer server system, a base topic for a personalized media stream for a user of a computer system. The process also includes identifying, with the computer server system, a plurality of media items associated with the base topic using a plurality of different and independent categories of media categorization data. Each of the categories of media categorization data is assigned a weighting. The process further includes building a collection of candidate media items from the identified plurality of media items. The process also includes ordering the collection of candidate media items to form a personalized media stream. The process further includes providing the ordered collection of candidate media items for playing to the user.

In some aspects, the base topic is selected from a group consisting of a song title, an artist, a genre, and a mood. The weightings can be assigned according to a combination of (a) a level of influence by a particular category of media categorization data in producing a desirable media user experience, and (b) an identified integrity of the source of the particular category of media categorization data. The method can also include identifying that the collection of candidate media items is deficient and applying a media selection override to identify a second plurality of candidate media items. Moreover, the categories of media categorization data may be selected from at least two in a group consisting of broadcast radio spin counts, acoustic analysis data, data derived from analysis of web pages, commercially-sourced media metadata, and data that indicates public user interaction with media-related entities.

In certain other aspects, ordering the collection of candidate media items includes changing an initial order of the collection of candidate media items to place the media items into regulatory or licensing compliance. Also, the regulatory or licensing compliance can include digital millennium copyright act (DMCA) compliance. In addition, ordering the collection of candidate media items can include sorting the media items by a determined popularity. Moreover, the popularity can be determined using broadcast radio spin counts. And ordering the collection of candidate media items can include biasing a play order according to artist similarity to the base topic.

Details of one or more implementations are set forth in the accompanying drawings and the description below. Other features and advantages will be apparent from the description and drawings, and from the claims.

DESCRIPTION OF DRAWINGS

In the drawings, like reference numbers refer to similar elements throughout.

DETAILED DESCRIPTION

Described herein is a media selection and presentation system, and related techniques, that runs on a computer-based system to identify media items (e.g., songs, video shorts, podcasts, advertisements, and the like) that are targeted to the interests of a particular user or users. The media items may be selected by the system to be provided to the user or users serially, such as in the form of an internet radio station. Such a station may be initially seeded with a selection, such as by the identification of a particular genre, song, or artist. The selection may serve as a topic (and perhaps a title) for the radio station. The seed selection may be used by the system to identify music that would be liked by someone who is in the mood for music that is similar—in some determined manner—to the seed selection. The criteria for selecting media items may also blend in other factors, including past behavior by the particular user, such as "thumbs up" or "thumbs down" selections for particular media items, and the user's web browsing history, among other things. After an initial selection of items is made, the selection may be modified, or subsequent selections may be affected by feedback from a listener, such as in the form of numerical or star ratings or thumbs-up/thumbs-down ratings that the listener gives to songs that are selected and played for the station.

Figure 1:
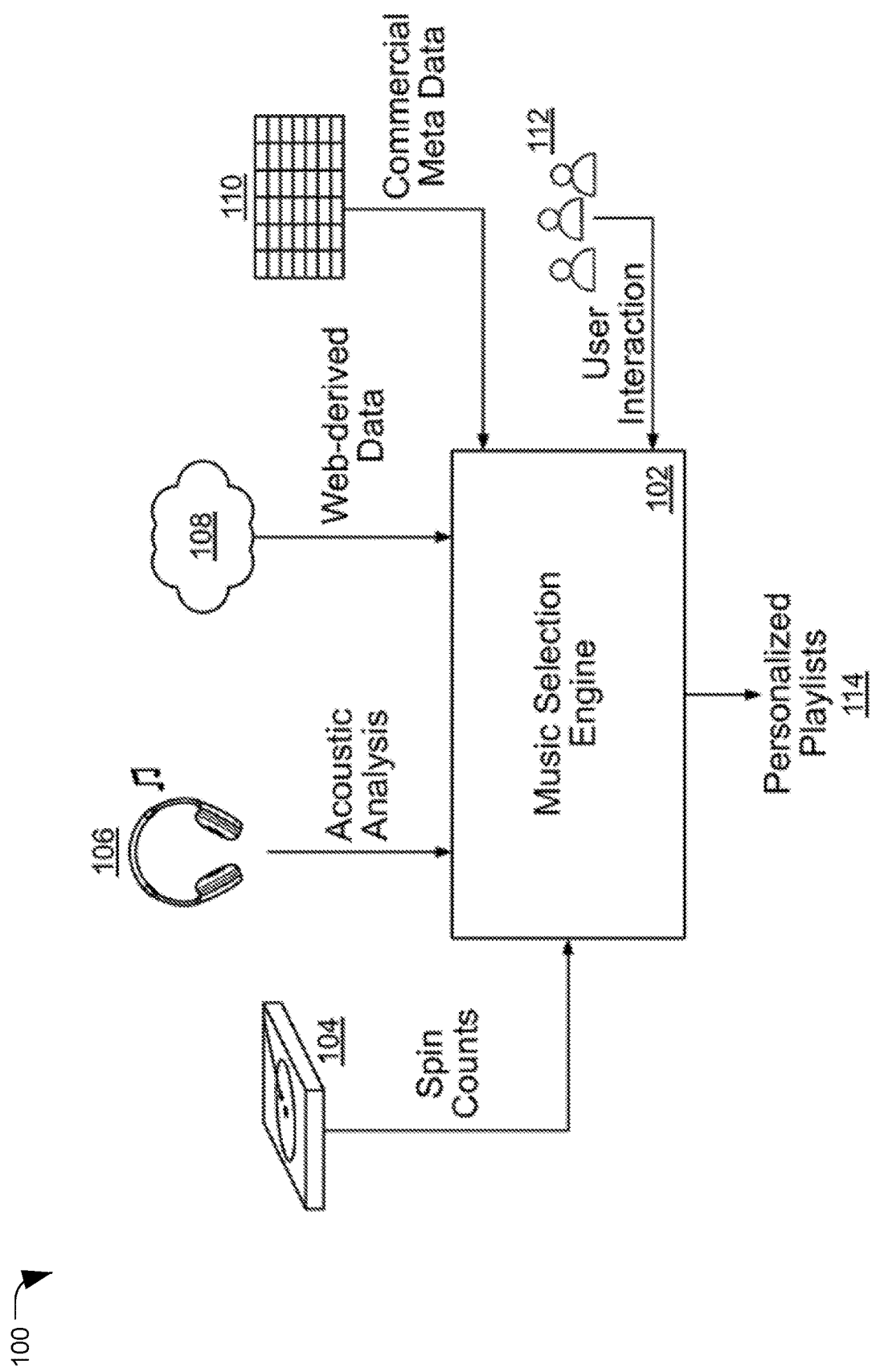
FIG. 1 is a conceptual diagram of a music selection engine for generating song selections for on-line personalized radio stations.

FIG. 1 is a conceptual diagram of a music selection engine for generating song selections for on-line personalized radio stations. FIG. 1 shows an illustrative system that takes in information from multiple different categories, the information may be gathered by multiple different organizations, or sources, and blends the data in order to make a determination of what songs or other media items to include as candidates for presentation in a personalized internet radio station format. Such data is used to select songs that are likely to match a topic (e.g., as exemplified by a song title or artist name) as candidates for playing, and then to order at least some of the candidates (e.g., by selecting a first song or by building an entire list of multiple songs).

Such building of a playlist may occur song-by-song (where each song is not selected for inclusion in the playlist until it needs to be, such as several seconds before a prior song is set to end playing, or when a user chooses to skip to a next song) or in a bulk manner, such as by periodically using the latest information about a user's preferences and latest information from the multiple different organizations to select a block of multiple songs to play and to order that block.

In general, FIG. 1 shows a system 100 having at its center a music selection engine 102 that receives a number of different data categories from various sources of data that can be used for making matches of songs and song types, and for otherwise categorizing media items (e.g., songs) for selecting the proper items to play to a particular user.

One such source is spin counts 104 from broadcast radio stations such as terrestrial or broadcast internet stations. The spin counts 104 indicate a frequency with which particular songs were played on such stations during a defined time period such as the most recent n days, and can be a good source for indicating recently trending music and other media. In particular, broadcast disk jockeys may set trends, so that using such data can cause a playlist to include new music that a user has not heard before. However, old or unique music may be played little or not at all on broadcast radio stations, because such stations attempt to appeal to a relatively broad array of listeners. Thus, such information is generally very timely (even leading the newest desires of users) but may be incomplete.

The spin data can include basic spin counts, additional information, or both. For example, to qualify for inclusion, a song may have been played more than a predetermined number of times across a set of stations or at a single particular station, or played on a predetermined number of stations or a predetermined number of stations whose format matches the a format that corresponds to the seed for the personalized station. Alternatively or in addition, a system may determine that, to qualify for inclusion, a song be played at least once or a different predetermined number of times at particular stations, such as at a national top 20 radio station.

In more complex structures, the spin counts 104 can be weighted according to the market size in which they occurred. Also, in addition to looking at recent spin data, a system can factor in spin counts going back a determined number of years, and such counts can be given their own weighting (which will generally be lower than a weighting for more recent spin counts). Such use of historical data at a low weighting can cause items that have had some past airplay to be boosted over items that have had no airplay, though below items recently receiving airplay (and even further below items have a high level of recent airplay).

Moreover, video spin counts may be computed in similar ways for music videos that are associated with particular songs and/or artists (where the spin count for an artist may be equal to the cumulative spin count of all the artist's songs). For example, commercial video play on stations such as MTV® (a registered trademark of Viacom International Inc.) and VH1® (a registered trademark of Viacom International Inc.) can be employed and provided with a weighting, as can play counts on on-line video sites such as YouTube® (a registered trademark of Google, Inc.). Such video plays can then be added, with an appropriate weighting to the other spin counts, or to other sources of popularity data for selecting a relevant playlist. Similarly, when the playlist being constructed is a list of videos rather than audio songs, the weightings can be reversed, so that play counts for video are weighted more highly than are play counts for songs.

Acoustic analysis 106, another source of song data for forming a playlist, is electronic or manual analysis of songs that defines actual characteristics of the particular song. The acoustic analysis 106 indicates, for example, a song's tonality, beat-per-minute, and other such features that characterize the song. The acoustic analysis 106 can include vast amounts of data that characterize each song. The acoustic analysis 106 may be very good at identifying objective similarities between many songs (and thus provide predictability with a long tail), but does not indicate popularity of songs or factors that may connect songs in a user's mind that do not depend on such acoustic similarity. For example, a user may like to listen to Pearl Jam songs when listening to a Neil Young station simply because the artists have collaborated and/or have somewhat similar public images, even if acoustic analysis might determine that their songs sound very different.

Particular acoustic parameters may be represented as nodes in a graph or points in a matrix, and a value may be stored for each such parameter for each particular song. Using such representations, a song can be readily associated with particular other songs, and/or can be grouped into acoustic tiers with similar songs. As such, a method can select songs that are adjacent to each other in a graph and step further away in adjacency as songs are exhausted, or can selects songs in a common tier and then move to next-adjacent tiers as songs are exhausted.

Web-derived data 108, from yet another source, may be identified by a system by the process of crawling or scraping web page data, such as information posted by users of social networking sites, blogs about music, magazine and newspaper sites, and similar sites. Alternatively, music blogs may be searched. Such data may identify newly popular songs, and also relationships between songs or artists. For example, a whitelist of media-related terms may be provided to a crawler, such as in the form of a list of known song and artist names, and available web sites or web sites at domains known to be associated with music may be crawled and indexed for the whitelist terms. The whitelist may be continually updated as new artists emerge, and existing artist release new songs. The number of mentions of an artist and/or album or song on the crawled pages may then serve as an indicator of popularity for the particular item. Also, certain pages or classes of pages may be weighted more heavily than may others, and a weighted popularity score may be generated from such crawling. For example, mainstream entertainment publications such as Spin® (a registered trademark of SpinMedia Group, Inc.), Rolling Stone®

(a registered trademark of Rolling Stone LLC), and the New York Times® (a registered trademark of The New York Times Company) may receive higher ratings. However, because such information is not necessarily aimed by its creators at making connections, its accuracy may be lower than that for more deliberately-formed data or data that characterizes the songs themselves, and its weighting vis-a-vis others of the source may be adjusted accordingly, and variable weighting may be provided for newer songs or artists as compared to songs or artists that have been found in crawls for a relatively long time.

Commercial metadata 110, from yet another source, may include a variety of data that is not acoustic analysis but otherwise characterizes a media item. For example, such data may indicate a genre for a song, the types of instruments played in the song, an artist or artists or group performing a song or in a song, etc. Such data may be used to generate connections between songs or artists, for use in selecting songs for a playlist. The commercial metadata 110 may also include tone or mood descriptors associated with a song, editorial ratings of an album and editorial identification of a track as being a significant work from the album (e.g., a top single on the charts).

User interaction data 112, from another source, may be click data or data showing songs listened to (and perhaps skipped by particular users). For example, a song may be considered to be more popular if a search engine reports an upward trend in the number of search queries being submitted with the title of the song, the name of an artist that sings the song, or with lyrics from the song. Popularity of a song would also increase if more users were determined to have thumbs up'ed the song, as opposed to thumbs down'ed it. Such a determination may also depend on concurrence data for user feedback (e.g., a first song may be determined to be more relevant to a user if that user is determined to like a second song, and other users who have linked the first song have also liked the second song at statistically significant rates or proportions). Such data may include a variety of clickstreams, including clicks on web-presented data, clicks indicating likes and dislikes, and other user interactions that directly reflect a user's opinion of a song or other item.

In a particular example, the music selection engine 102 takes into account two or more of these categories of data and produces a list of songs that may match a query or other input associated with a user (e.g., a topic, song title, group, or genre), generally provided as a seed and subsequently modified by feedback from the user (e.g., showing that the user likes or dislikes previous songs played on the station) and then orders the songs for playing to the user. The selected songs may then be played in a familiar manner.

Factors considered when building a playlist, which are constructed from the two or more categories described above include (each factor is discussed in more detail with respect to FIG. 3 below):

Artist Rank: Such a factor ranks all artists in a catalog or sub-catalog that reflects a popularity of the artist with the public at a current time, and such currency is maintained by biasing the ranking to user data for a streaming service, such as positive reviews (e.g., thumbs up) of a song or artist by a user (or to the contrary, a thumbs down). The artist rank factor also takes into account rankings derived from third party datasets and human curation.

Artist-to-Artist Connections: A model may be built periodically, and made available at the time of song selection, that correlates artists to each other, such as in a series of hierarchical connections where each artist is considered a seed and each other artist is considered a child (with a numerical degrees of connectedness between each of them) or in a graph in which each artist is a node and the edges between the nodes are assigned a degree of connectedness between the artists represented by the pair of nodes at each end of an edge.

Track Rank: This factor ranks all the tracks (songs) of an artist relative to each other, and in some implementations, to tracks of other artists. The tracks are ranked according to relative popularity, and can also be grouped into tiers of hits, deep cuts, deeper cuts, and deep catalog, or similar tiers that each represent multiple songs across a large number of artists (where any artist might have none or multiple songs in any tier, though an artist with many songs would be expected to have multiple songs in each tier).

Acoustic Model: This factor may be a list of tracks ranked according to their acoustic scale, which is generated by acoustic attributes assigned to the tracks, such as beats per minute, key, loudness, etc. The relatedness of songs to each other in terms of an acoustic model may be represented by one or more graphs, where the songs are at the nodes, and the edges are assigned a level of connectedness—where different graphs may represent a different aspect or aspects of the acoustic model for connectedness.

As shown in FIG. 1, the music selection engine 102 may combine the various categories of input in a hybrid manner to produce personalized playlists 114 for users who have requested a media stream. Such playlists may be generated by receiving an input from a user or third party of a "seed" and then identifying songs that are similar to the seed. The song selections may be based on the factors above, and may be affected once the playlist has begun playing, by a user's reactions to songs that are played, such as by the user ranking songs that have played on a numerical scale, or by the user giving a thumbs up or thumbs down to particular songs. Such actions by a user may bias the song selection model toward liked songs or away from unliked songs. As described in more detail below then, two or more of the categories, or sources, described here may be used to identify a group of songs that are similar to a seed song or artist (or other identifier) using the various input parameters, and the same or other categories may be used to rank those candidate songs for the order in which they will be played by a user.

Additional operations may also be applied to a playlist, such as shuffling artists so that they do not play in the same sequence (either within a listening session or between sessions), maintaining DMCA compliance, ensuring that a song does not repeat within a predetermined time period, biasing the system toward playing songs from the seed artist more often than songs from other artists, increasing a likelihood that a recently-played song does not play in the near future, increasing the likelihood of hearing thumbed up songs more often, and never playing thumbed down songs again, either on the particular personalized station, on all stations for a particular user, or at least for a predetermined time period (e.g., not replaying a thumbed down song for at least two weeks).

Figure 2:
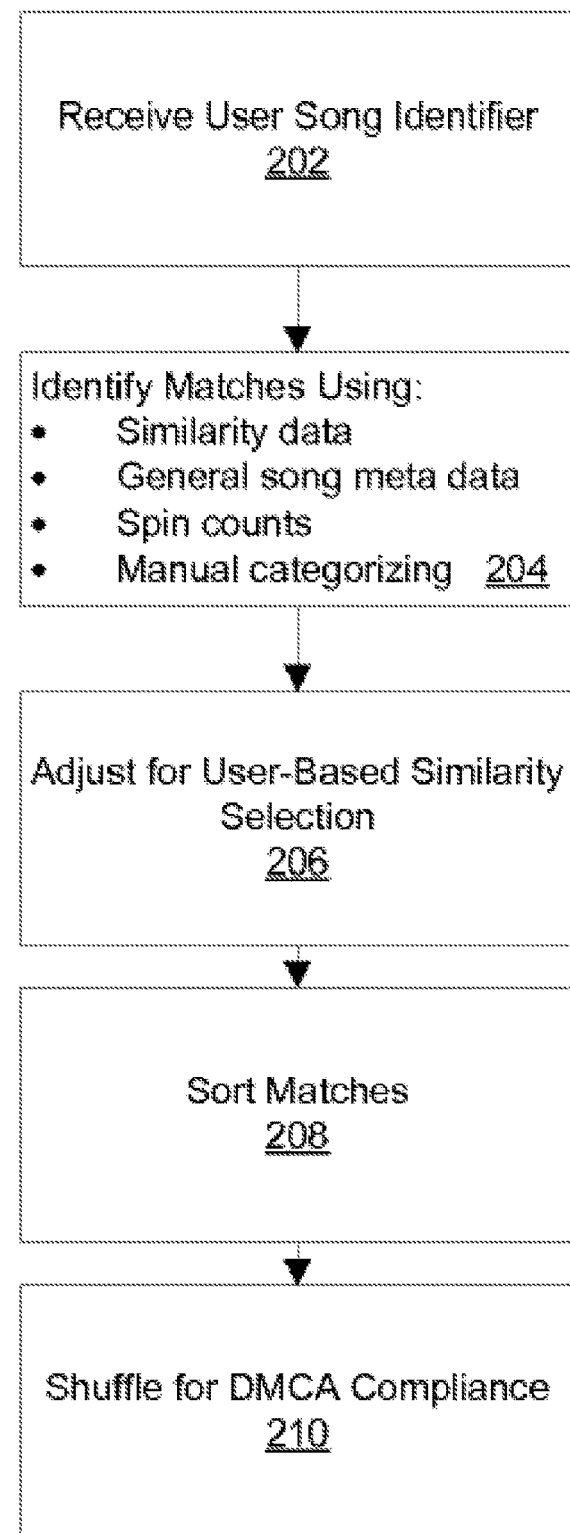
FIGS. 2 and 3 are flow charts of processes for selecting songs to play to a listener.
Figure 3:
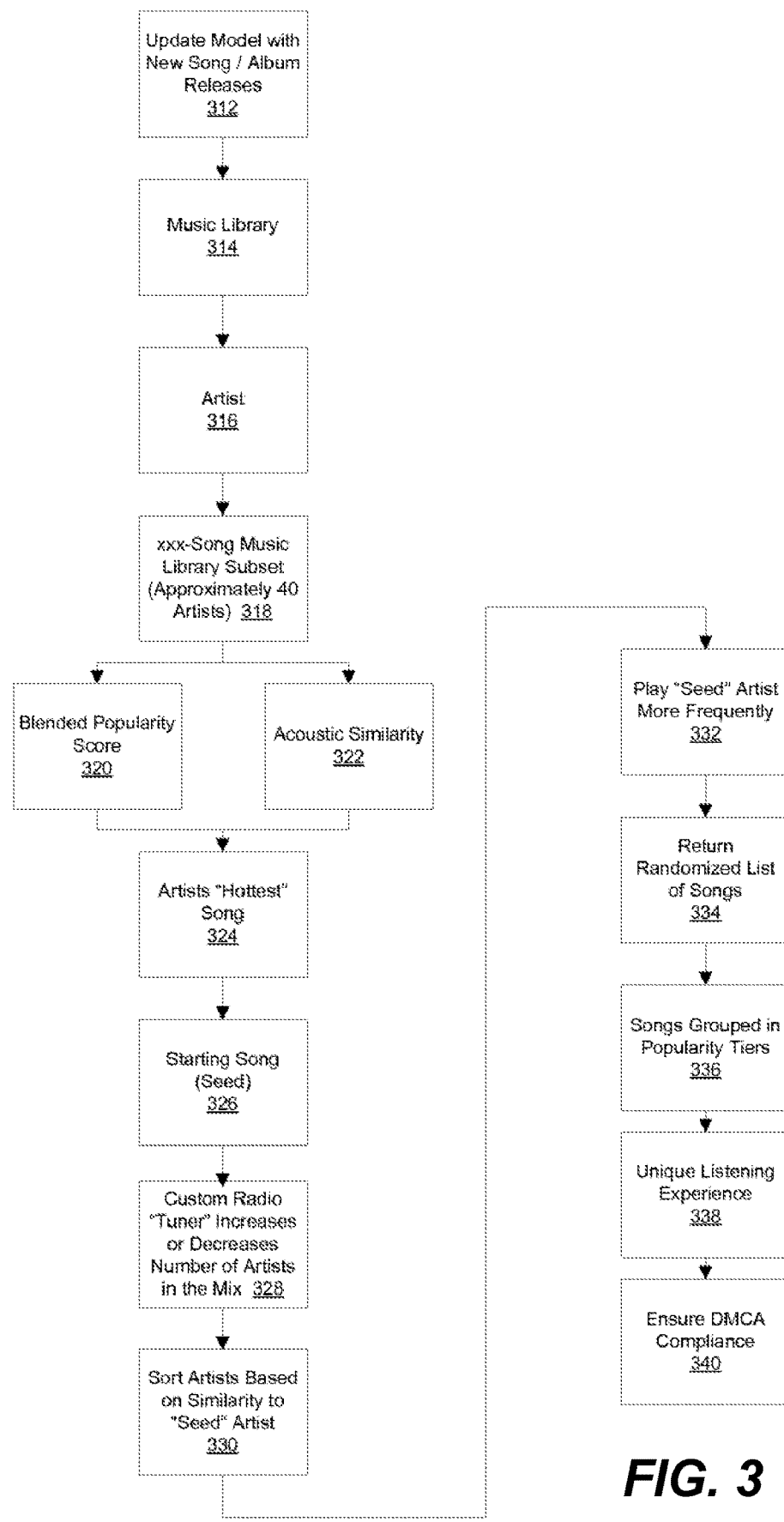

FIGS. 2 and 3 are flow charts of processes for selecting songs to play to a listener. FIG. 2 generally shows the process in summary form, while FIG. 3 provides more detail for a similar process.

Referring to FIG. 2, a process includes receiving a user song identifier (box 202) such as a song title, genre, or group name. The identifier may be received in a variety of ways.

For example, a user may select an identifier from a list or may type an identifier into a computing device—e.g., typing "Bruce Springsteen" into a search box. The identifier may have also previously been provided by the user, e.g., when the user in a prior listening session established a streaming personalized station, and the user may then select that identifier from a list (e.g., a list of radio stations for the user), or the identifier may be automatically selected upon the user launching a streaming media player.

At box 204, the process includes identifying matching songs using two or more of a variety of different data sources. Those data sources may include the sources discussed above with respect to FIG. 1, including similarity data (e.g., from acoustic modeling), general song metadata (e.g., identifying the gender of an artist, the genre of a song or artist, etc.), spin counts (e.g., received from radio station programming directories or from services that monitor airplay), and manual categorizing, among other categories for providing ranking-related data.

For example, similarity data may include similarity data based on analysis of the songs themselves or analysis of other sources. As one example, a third party service may provide metadata regarding song-to-song (s2s) similarity, artist-to-artist (a2a) similarity, and artist and/or song hotness (which shows a point-in-time value), and artist familiarity (which indicates how likely it is that an artist is known to a general member of the public). Such information can be provided by services such as Echo Nest® (a registered trademark of the Echo Nest Corp.), Rovi® (a registered trademark of Rovi Solutions Corporation), and others. Such data can be derived in a variety of ways, including by scraping web pages to understand what artists and songs are being discussed (e.g., to identify hotness and familiarity) and which artists and songs are being talked about together (a2a and s2s).

Separately, such data may be accumulated by acoustic analysis, where an acoustic analysis model is repeatedly updated as new music is released, and represents s2s similarity through aspects such as tempo, mood, etc., and pairs songs together along with a factor that represents their paired degree of relatedness. To ensure that acoustic matches are relevant to actual users, associations found using acoustic match data that are not found in web scraping or other data may be discounting (e.g., if they are found rarely in the scraping data) or eliminated (e.g., if they are never or essentially never found in such data). Thus, in addition to being combined in a weighted manner, various data sources can be used to serve as a check on other sources of data before a combined score is generated using the sources together, e.g., to throw out outlying data points.

Other metadata may be provided by a third party service such as Rovi® (a registered trademark of Rovi Solutions Corporation), and can include artist-to-artist associations, a2a (which may be weighted), musical style descriptors, and mood and/or tone descriptors (for artists and songs), genre data (for artists and albums), artistic significance indicators (at artist and album and song level, e.g., if a song, record, or artist received a Grammy® (a registered trademark of National Academy of Recording Arts & Sciences, Inc.) award), track and album version data, album ratings, and track picks. Such data may be prepared and edited by a human editorial staff, and also from data provided by record labels when music is released.

Public usage data, such as spin counts, may be obtained from radio stations or services that monitor radio stations and other similar services. Such information can include spin counts, the number of times music videos are selected by members of the public on services such as YouTube® (a registered trademark of Google, Inc.), and the like.

Finally, user interaction data can also be used to identify relationships between songs or artists, and popularity of songs and artists, and the likelihood that a particular user is going to like a selected song or artist. For example, a user's social networking profile page (and those of the user's friends) can be analyzed to determine if they have "liked" any particular artists or songs. A media library for a user (e.g., on the user's own computer or in the cloud) may also be analyzed to determine the user's interests for exploring additional music that is different from what they already own. Also, thumbed up and thumbed down selections by a user may be employed in a similar manner.

The relative weight accorded to each source can vary, including based on (a) a level of influence by a particular category of media categorization data producing a desirable media user experience, and (b) an identified integrity of the source of the particular category of media categorization data. For example, each category may be given a first score based on observed experience, with how accurately it generates song suggestions that users actually prefer. Such a determination may be made by manual consumer testing—e.g., by obtaining a "seed" from each of multiple users, playing them each songs selected using one of the categories, and obtaining their responses to such songs. Such testing is frequently known as "NB" testing, and known statistical techniques for analyzing such tests can be used to identify relative correlations between particular categories and improvement in ability to select songs that users prefer.

At box 206, the process includes adjusting the selected songs based on a similarity level selected by a user. In addition, or alternatively, the adjustment may affect the level of popularity of songs that the system will determine to be acceptable for a song selection. For example, a "loose" setting (selected by the particular user) may cause a system to be open to songs or artists that are less closely related to a seed artist or song, and may also make the system more open to selecting songs that have lower popularity.

Such adjustment may occur after an initial group of candidate songs is selected so as to remove some of the songs or rank the songs differently. Alternatively, such a factor may be used to bias the original process for selecting candidate songs so as permit broader selection of songs versus narrower selection of songs. For example, where a user chooses to include less familiar songs in a playlist (as opposed to only more familiar songs), the importance of a2a and s2s similarity to a user's "seed" song, or other baseline or baselines for selecting songs, may be lessened when selecting songs so that songs that are more distant from the seed song are more likely to be selected by the system. In such a situation, other categories of information may become more important, such as popularity data in the form of spin rates or levels to which other users have indicated that they liked a song.

At box 208, the process includes sorting the matches. Such sorting may be premised on a mixture, for example, of (a) songs that are most like the seed song (or other seed factor) and (b) are currently the most popular, with such determinations also made using the plurality of different categories, and weighting the contribution of each category based on its determined level of influence and its determined integrity. More detail about techniques for sorting songs are described below with respect to FIG. 3.

Other particular sorting rules may also be employed. For example, songs by the same artist as an initially-played song may be repeated more times toward the beginning of a playlist. Also, popular songs may be elevated in the playlist. Also, a playlist may be ordered according to a cost that is to be paid for playing certain media items and at box 210, the process includes shuffling the list so as to comply with DMCA requirements. For example, higher-cost songs may receive lower scores or may be spaced apart according to a predetermined spacing level (e.g., "hit" songs by-cost may be played only every n songs, with lower-cost songs interspersed). Also, an acceptable cost may be associated with a playlist, and songs may be selected from particular cost tiers so as to maintain the acceptable cost level (e.g., if the cumulative per-song cost falls sufficiently below a determined level, a hit song may be selected (which may cause the cost to rise closer to, or above, the level)).

Referring now to FIG. 3, a process begins at box 312 with a system updating a model of music selection with a new release. Such a process may occur periodically, such as each week, and may involve updating data from multiple sources like those shown above in FIG. 1. For example, the song may be input to an acoustic analysis system, and metadata from outside the song may be generated or obtained (e.g., from a label). A scan of the interne may also be made by the service that streams personalized music, or by another organization, to determine whether the song has had any pre-release press. Such press may, for example, assign the song (or album) a letter or star rating, which a system may identify automatically and may use to assign the song with an initial quality or popularity score. Similarly, such pre-release reviews may compare the song to other prior songs, and such comparisons can be identified automatically by the co-occurrence of the song titles on a single web page. As such, s2s similarities can begin to be built by the system for a new song or album.

At box 314, the process includes accessing a music library, such as by obtaining data from multiple sources. The sources may have been previously accessed also, and hybrid data for a music library may have been previously created from them, such as by periodically updating a music selection library. The music library may include information that, for example, defines a network of song and/or artist nodes and includes edges between the nodes that define associations between particular artists and other artists, particular songs and other songs, or between artists and songs. Such relationships may have been formed in manners like those discussed above.

At box 316, the process includes accessing artist information for one or more songs. For example, where a user has entered a song title as a baseline or "seed" for a station, the song title may be provided to the system, which may then find the corresponding node in the network or other data representation for that song, and may then use the parameters and position of the node in the network to find other songs to consider as candidates for playing in a playlist.

At box 318, the process includes obtaining a sub-set of the library and searching the sub-set to identify songs that are similar to a selected keyword or other topic (e.g., an initially-entered song title). As one example, a predetermined number of artists (e.g., about 20, 30, 40, or 50) may be identified based on a2a similarity with the artist corresponding to the song or other item with which the station was seeded. Such artists may be found simply by supplying an identifier of the baseline artist, with the system returning a top n-rated other artists.

The process includes selecting songs based on a combination of blended popularity score (box 320) and acoustic similarity (box 322) to an original seed song or other topic. Other categories of potential relevance may also be used in order to produce a blended, or hybrid, level of relevance for selection as candidate songs.

As explained above, a consideration for song selection includes an artist rank—where higher-ranked artists will be more likely to be selected to provide candidate songs for a playlist. The artist rank may be a weighed combination of artist popularity indications from multiple different categories of data collected from different organizations. For example, the following rank factors may be used to create such an artist ranking:

Popularity in personalized radio stations—personalized stations can be created by users of a service from artists and songs (with the songs then correlated to their artists), and the number of such station creations (perhaps normalized for easy comparison and ranking) can serve as an indication of the popularity of the artist. This factor can be given a moderate to high weighting relative to the other factors.

Rank in broadcast radio spins—this factor is similar to the prior factor, but represents selections by program directors (which tend to be leading indicators of popularity, and more informed) for mass consumption (which means the selections are targeted at having a broad audience). As a result, they may be given a high weighting, and in some implementations may provide more than 50% or more than 75% of the overall weight for an artist determination.

Familiarity—Surveys may be conducted to determine how many people in the general population are familiar with an artist, and this factor may be used and given a medium weighting because people can be assumed to desire music from artists they already know.

Associated artists—This factor indicates where an artist ranks in terms of the total number of associated artists. It may be given a relatively low weighting.

Descriptor Rank—This factor indicates an artist's rank in terms of the total number of descriptors assigned to the artist, and it may be provided a relatively low weighting.

From the combined hybrid rankings, particular artists can be binned into a plurality of tiers, such as four tiers, where the tier level can represent a combination of the factors above plus whether the artist is from a major label or not (because it can be assumed that artists form major labels will obtain more national promotion, and thus be more likely to appeal to a larger number of users of a music streaming service).

Separately, an a2a model can be built and used to select songs as candidates for a personalized station, based on a list of child artists being identified from a seed artist based on level of similarity. In this category, a user may be allowed to set a level of "relatedness" that they would like applied to the system's song selection for them. As one example, when top a2a relationships are identified for a user, they may be binned into groups that are equal in number to the number of discrete relatedness levels a user can select through a user interface (see FIGS. 5A and 5B). The most-related group can be the only group used if the user requests close relationship, while additional lower groups can be used if the user requests a looser degree of relationship. The rankings of the relevant artists or songs, as related to the seed, may be maintained so that more distant artists and songs are less likely to be selected or will be played less often, or each of the groups may be assigned a relevance level, so that each member of the corresponding group will be assigned the same level of relatedness vis-a-vis the seed.

Each level and/or each a2a group may be assigned a minimum number of artists so as to maintain regulatory or contractual limits, such as DMCA limits. Also, groups of artists obtained from one third-party may be modified, such as to remove artists that are shown to be poorly received, based on data from other sources (e.g., artists that have no web mentions or almost no web mentions). Moreover, artists may be added to a group if they have a strong connection to a child of the seed artist, and particularly if they have a strong connection to a child that has a strong connection to the seed artist.

A sort rank may be generated for the artists identified via a2a similarity (either in advance or at run time), using the following factors:

Style score (from one or more sources that score styles)—a score that represents the number of stylistic parameters that the two artists have in common (with a high weighting);

Tone score—a score that represents the number of tonal parameters that the two artists have in common (with a medium weighting);

Backlinks—an indication that the child artist has the parent (e.g., seed) artist associated with it as an overall similar artist (high weighting);

Origin—a boost score can be applied when the parent and child both originate from the same geographic region (particularly if it is the geographic region of the user who is requesting a playlist, such as determined by an IP address of the user's requesting computing device);

Source—a boost score that can be assigned if multiple different a2a sources list the artist as a child of the parent (e.g., the seed).

Certain overrides may also be provided when determining a2a correlations. For example, operators of a system may know that certain artists are tightly related, but may discover that none of the parties that supply a2a data list those artists as parent and child. Thus, they may provide for an override that is applied each time a model is built, after the data from the third-party sources is run. Similarly, relationships can be removed from the reported data when operators discover that they are poor performers.

Finally, the process may also take into account the rank of particular songs or tracks in making song selections for candidate songs and for ordering of a playlist. Such songs may then be binned into tiers for hits, deep cuts, deeper cuts, and deep catalog, as indicated above. For example, with the related artists identified, a service may also have a list of songs (e.g., 10, 20, or 30 songs) for each child artist that is most closely related to the parent artist or the identified song of the parent artist. Those songs may then be ranked and binned based on popularity (because users are likely to tune out of a station if it plays too many unpopular songs). Also, various external measures may be used to make sure that songs that are unpopular are not queued even though they might have close acoustic or other similarity to a seed song, such as:

Primary Album—This factor indicates that the track comes from a main album, as opposed to a soundtrack or compilation. It receives a high weighting.

Track Pick—This factor indicates that a human editor has picked the track as a top track. It has a high weighting.

Album Rating—This factor is the same as the track pick, but for the album. It receives a relatively low weighting.

Track/Album Artistname Comparision—This factor indicates whether the track artistname matches the album artistname. It has a relatively low weighting.

Current Spin Count—This factor indicates the total or normalized spin count for the song at various broadcast stations in the last defined number of days. It receives a high weighting.

Radio History—This factor indicates whether the song has been played on a broadcast radio station (presumably, a popular song will have been played at some point), and can be binary or may represent a number of times the song has been played, or the average number of times per year since the song has been release or since the data has been kept. This factor receives a moderate weighting.

Hotness—This factor indicates a hotness level assigned to a track by a third party, and receives a high weighting New Release—This is a binary factor that is 1 if the album was released in the last year. It receives a medium weighting, and the weighting can be higher if the seed song is also a new release (which suggests that the user is looking for recent music rather than classic tracks).

Custom Radio popularity—This factor indicates the relative popularity of the song as a seed for other users who have created custom stations. It can receive a weighting that varies from low to high based on its value.

At box 324, the process includes identifying a hottest artist song, and setting a starting "seed" song (at box 326) for the playlist. Such selection may occur using the techniques discussed above, including where the seed may be entered as text by a user, or may be a song that the user was listening to when they chose to form a personalized stream of music.

A tuner may also increase or decrease the number of songs in the mix, such as by a user selecting to have more distant songs included in the mix (box 328). Such modifications of the song selection are discussed above, and may occur when candidate songs are initially selected, or after a first ground of candidate songs is selected, and then the number of such initially selected songs is narrowed using such a user selection.

The process includes sorting artists in the mix according to their similarity to the seed artist (box 330) and the placing the seed artist at particular positions in a playlist so that it is played more frequently (i.e., more songs form that artist are selected as candidate songs to be played). For example, a score for a song may be produced using the techniques discussed above, which may take into account both similarity and popularity parameters for particular songs, where the values for such parameters come from more than one of the categories discussed above, and are provided by multiple different parties/sources, including where two parties provide different instantiations of the same data. As for the seed artist, the playlist building may begin by having particular positions in any playlist reserved for songs from that artist, under an assumption that users will expect to see music from the artist they selected to start the station (or whose song they selected). For example, positions 1, 4, 10, and 15 may be reserved for songs by the seed artist, and these positions may be filled as part of the process of filling the other positions in the playlist, or may be filled in advance of filling the other positions. The playlist itself may be expressed in various manners, including in the form of an array of unique identification numbers for particular songs, so that a streaming server or the user's client device can be programmed to step sequentially through the array, and to submit the identification numbers to a streaming server which may then fetch the data for playing such songs.

At box 324, the various categories of inputs, and inputs like those shown in FIG. 1, are used to create a randomized list of songs, which in subsequent steps may be sorted to create a playlist. The list of songs may include those that match the conditions to be considered candidates for play as part of music stream for the requesting user. For example, several dozen or a hundred or more songs may be selected as candidate songs, and may be added to a list that can have further processing applied to its members, so that the list may be reordered into a queued play order for a playlist. As discussed above, the selection of such songs can depend on an input the user has provided at run time to define how adventurous his or her musical mood is, i.e., so as to define how far from the original seed the process should look for candidate songs. Thus, in one example, a user who starts a channel or station based on Bobby McFerrin and accepts distant song matches may end up being played a song from U2® (a registered trademark of Thengel, Ltd.) (where that song strays from U2's style) because once the horizons are opened up to the possibility of enveloping U2 music, the band's great general popularity may drive one of its songs into the list. (Perhaps "It's a Beautiful Day" will be picked because of its thematic equivalence with "Don't Worry, Be Happy.")

At box 336, the process includes grouping songs into popularity tiers. As described above for example, a defined number of tiers may be reserved (e.g., four tiers) so as to simplify the song-sorting process, and breaks in the list of songs may be generated based on popularity scores of the songs. In one implementation, the similarity determination may be based entirely on a2a association, and information such as an acoustic scale model may be used to group songs into acoustic ranges with each other, according to their popularity (e.g., each currently "popular" song may be correlated with other currently popular songs using the acoustic data). The ordering of the playlist may also be adjusted so as to avoid back-to-back playing of acoustic extremes, as indicated by the acoustic model, so that the acoustic of songs flow more evenly in a playlist.

The identification of most popular tracks, or songs, for each artist can be determined by identifying the artistic significance of an artist (e.g., by counting the number of associations in a database, such as a Rovi® (a registered trademark of Rovi Solutions Corporation) database, that point to the artist). For example, the Beatles® (a registered trademark of Apple Corps Limited) may be allowed to have more tracks at a certain tier for a playlist than can a newer artist, or a prolific artist of limited renown. An s2s model can expand on an a2a model by grouping songs from all artists into acoustic scale buckets or tiers. Those buckets can then be sub-grouped into popularity buckets by their track tier. The most popular of the most acoustically similar will be played first in a playlist. Tracks from other buckets can then be blended into the mix, using a combination of popularity and similarity. For example, a system might play a track that is in bucket 2 for similarity and bucket 1 for popularity and then a track that is bucket 1 for popularity and bucket 2 for similarity.

At box 338, the process includes reviewing data about the particular target user to further adjust the playing order so as to create a unique user listening experience that is different than that for other users. For example, thumbed up and thumbed down selections in the past by the user—on the same station the user is listening to and perhaps on other stations as well, may be used to further identify the user's desires. For example, a user may have entered Eminem® (a registered trademark of Mathers, Marshall B., III) as a seed song because he or she liked some of the artist's more thoughtful songs, and may have been put off when listening to harder-edged songs that a system played for such a station. Their reaction in the form of low ratings or thumbed down selections for such edgy songs may be used to remove or demote similar songs in the playlist. For example, a step of comparing characteristics of a thumbed down song to all candidate songs for a playlist may be performed, and the candidate songs may be reduced in rank by a degree that is proportionate to their level of similarity to the thumbed down song. Thus, although such songs may have been selected for inclusion in a candidate playlist based on their popularity and similarity to a seed song, they may be effectively disqualified from actually being played (e.g., by being lowered very far in the ranking of the candidate list).

Finally, at box 340, the process includes ensuring DMCA compliance, such as by shuffling the order of the songs. For example, compliance with contract or regulatory requirements may determine that songs by a common artist not be played in adjacent sequence, so a process can act to spread those songs out, and thus alter the playlist sequence.

Such a playlist then may be streamed or otherwise played for a requesting user. The process may repeat for each successive song or group of songs. For example, each time a user expresses a like or dislike for a playing song, a process may reshuffle the playlist queue so as to reflect that selection. Also, a user may switch channels (e.g., from the R.E.M.® (a registered trademark of R.E.M./Athens Ltd.) channel to the Violent Femmes® (a registered trademark of Add It Up Productions, Inc.) channel), and the process of building a candidate playlist and ordering songs in the playlist may be repeated. Playlists may also be saved between sessions so that a playlist may pick up where a user was when they were last listening to the playlist, though subsequent-played songs in the playlist may be updated so as to reflect new songs and changes in data that affect the ordering of songs.

Figure 4:
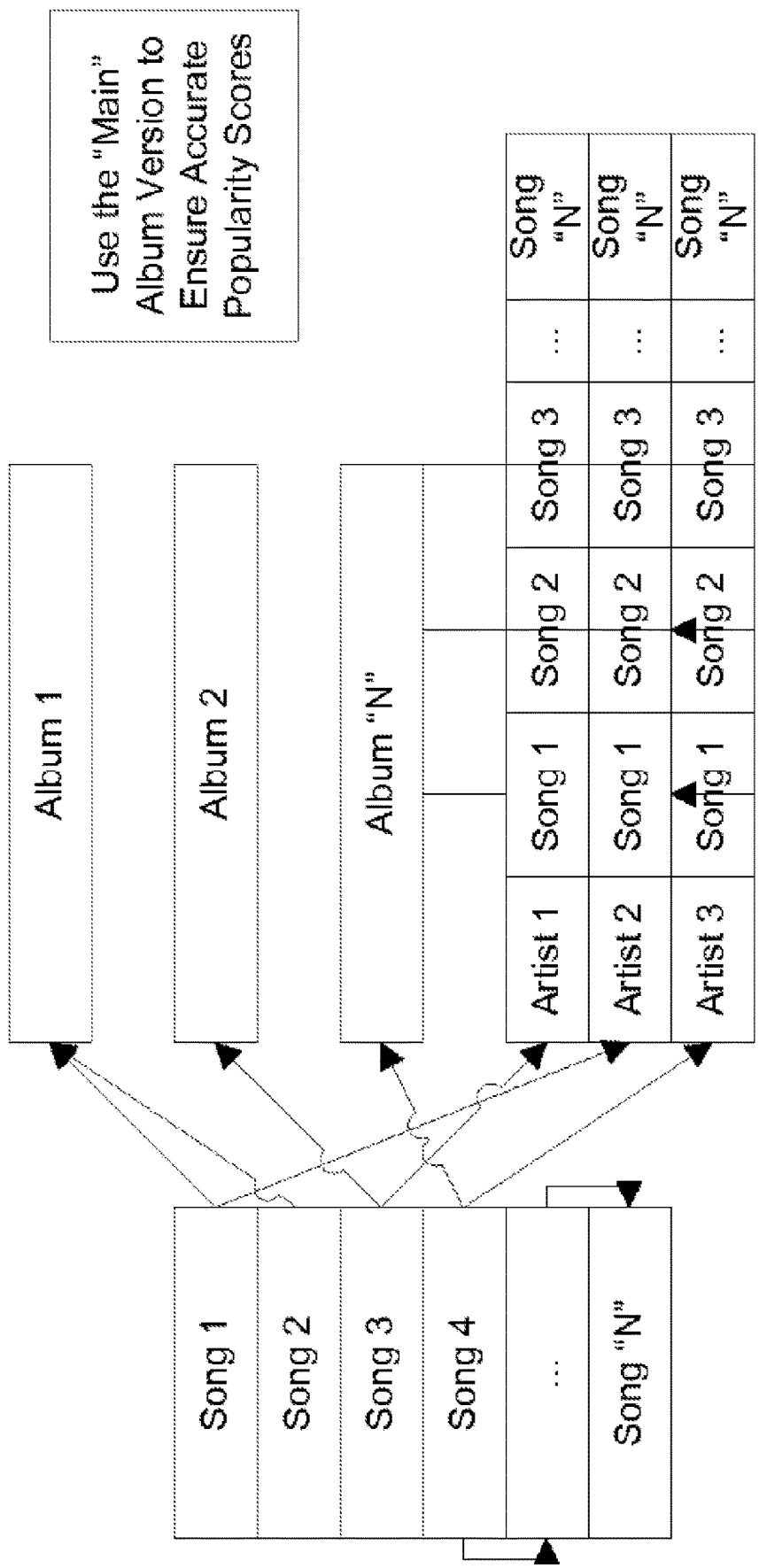
FIG. 4 shows mapping of songs into a playlist.

FIG. 4 shows mapping of songs into a playlist. In particular, this figure shows how particular albums and particular songs on albums may be placed into particular positions in a playlist. On the left is shown a queued playlist, with the top of the list showing the first song to be played, and subsequent songs in the list indicating subsequent songs to be played. The right column shows how particular albums have their songs mapped to the playlist. For example, both the initial song and the subsequent song are taken from the same album, so that a user will see close familiarity initially and better understand that the process is selecting related songs for the user rather than just random songs. Subsequent songs are taken from other albums (and other artists) so as to provide the user with a real radio station experience that provides discovery of new and different music.

The grid in the lower corner shows how sings for particular artists can be selected. In particular, all of the songs for each artist may be ranked relative to each other, such as based on their popularity and also based on their similarity to the seed (as adjusted by like/dislike input from the user while the playlist is playing). For example, the leftmost song in each row represents the highest-ranked song for that artist, and when the artist is selected by the process for supplying a song to the playlist, the next-highest-scoring song for that artist may be added to the playlist. Such identification of a next song can occur in real time as a previous song is ending (e.g., so as to permit maximum feedback from the user right up until the time the song is played) or may be selected in advance and added to the queue of songs for the playlist.

Figure 5A:
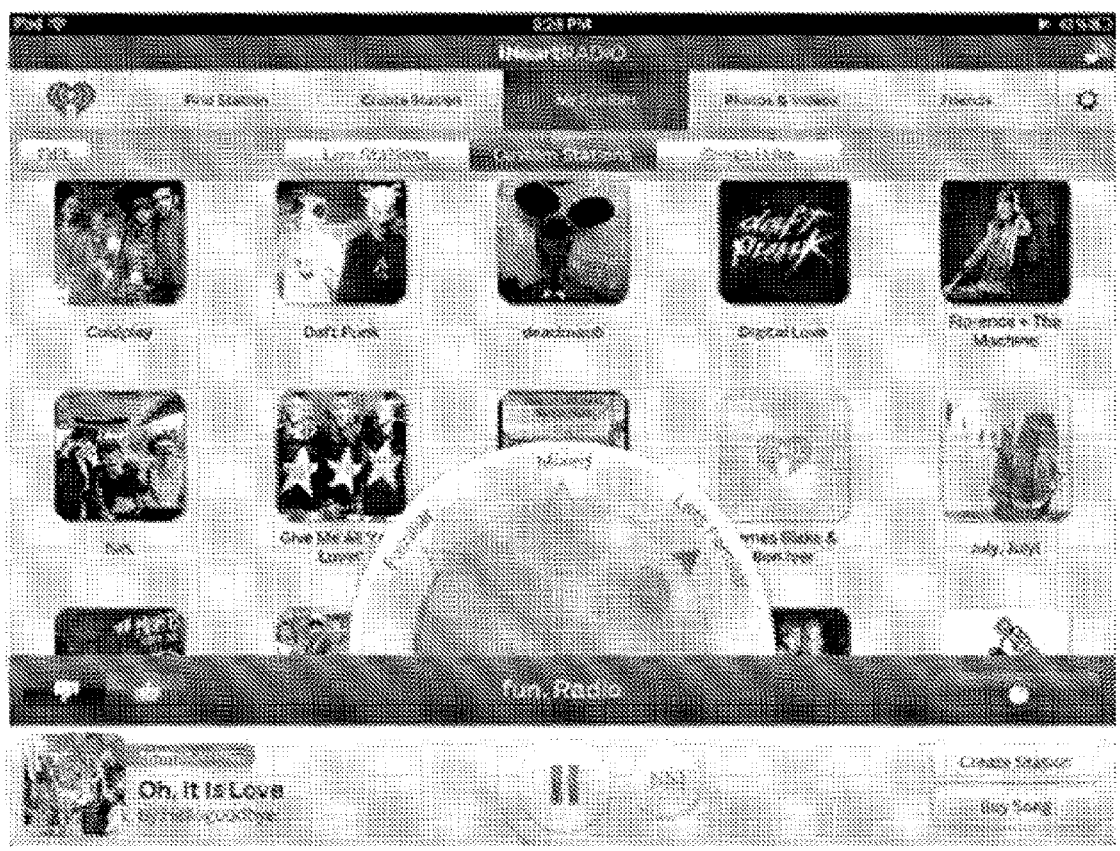
FIGS. 5A and 5B show example screen shots of user interfaces for interacting with a music streaming service.
Figure 5B:
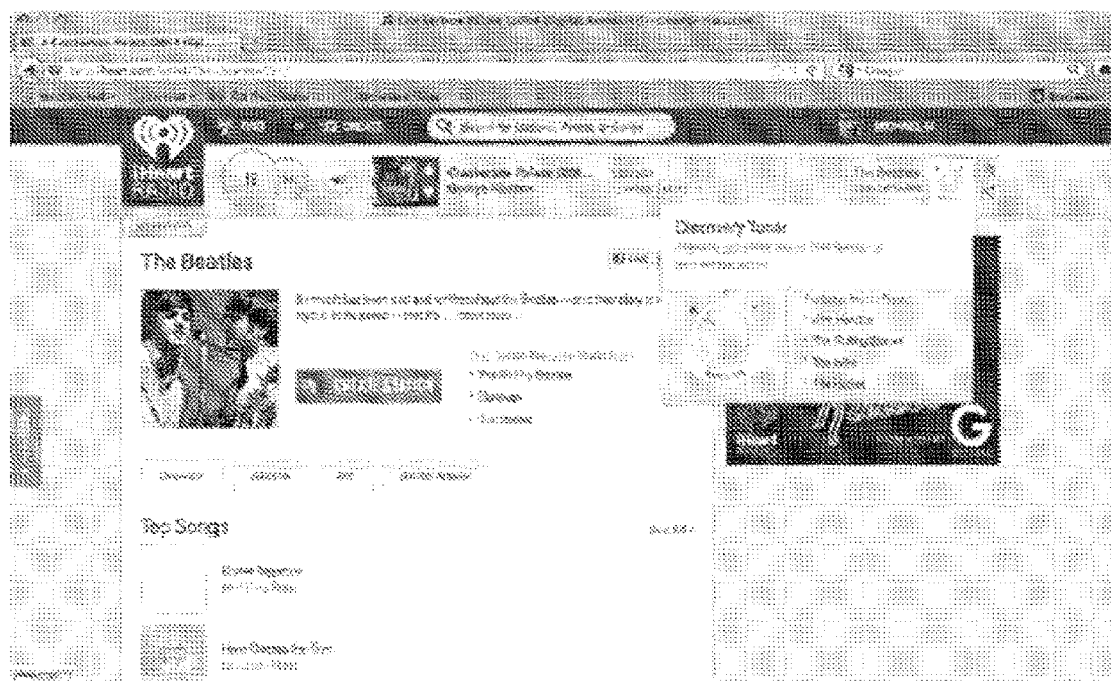

FIGS. 5A and 5B show example screen shots of user interfaces for interacting with a music streaming service. FIG. 5A, for example, shows a native application for a targeted streaming radio station. In particular, the figure shows a user-rotatable dial by which the user can select to enlarge the number of candidate songs included for selection on a playlist (rotating clockwise in this example) or to decrease the number of candidate songs (rotating counter-clockwise). The increase/decrease can affect both the level of similarity of a song for the song to be considered, and also the level of popularity for the song.

Icons for particular stations are shown on the canvas of the user interface behind the dial, and represent particular stations that the user has created and saved. For example, a deadmau5 station may play house and electronic music (as opposed to rock or country). Thus, a user may select such a station and then be shown the dial in order for the user to input how distant they would like their playlist to be from the core of the seed. For example, if the dial were rotated left for the deadmau5 station, the playlist might include only house music, whereas if were set on less familiar, the playlist might include electronic or even disco music. The distance may be based on automatically-determined acoustic similarity and/or on acoustic metadata applied by trained human reviewers.

Separately a "create station" button, when selected by a user, will raise a dialog box by which a user can enter the name of a new station—such as by typing a genre or the name of an artist or song. The system may filter and display the artists or songs that match the user's input, and the user may select one of the suggested solutions to establish a new station. Separately, the user interface displays familiar controls such as thumbs up/down inputs, play/pause/skip controls, an indicator of the song and artist that is currently playing (and optionally the song and artist that are on deck), and an option to download and purchase a copy of a song, such as an MP3 file.

FIG. 5B shows a similar user interface for use in a web-based version of the streaming service from FIG. 5A. In this example, similar user interface elements and user-input elements are provided, such as a search box, play/pause/skip controls, an indicator of the current song and artist, advertisements, and related information. Similarly, an icon is shown for a "relatedness" dial and when that icon is selected by a user, a popup window is generated that shows a larger version of the dial, with which the user may interact. The depiction of the dial and its selections may be slightly different, but the function may be the same (in part because both user interfaces are accessing the same back-end systems). In this example, the pop up window provides a list of the type of artists that may be played on the selected station, and that list may change as the user adjusts the dial, so as to provide the user with an immediate indication regarding what their loosening and tightening of the control will do to their personal listening experience.

Figure 6:
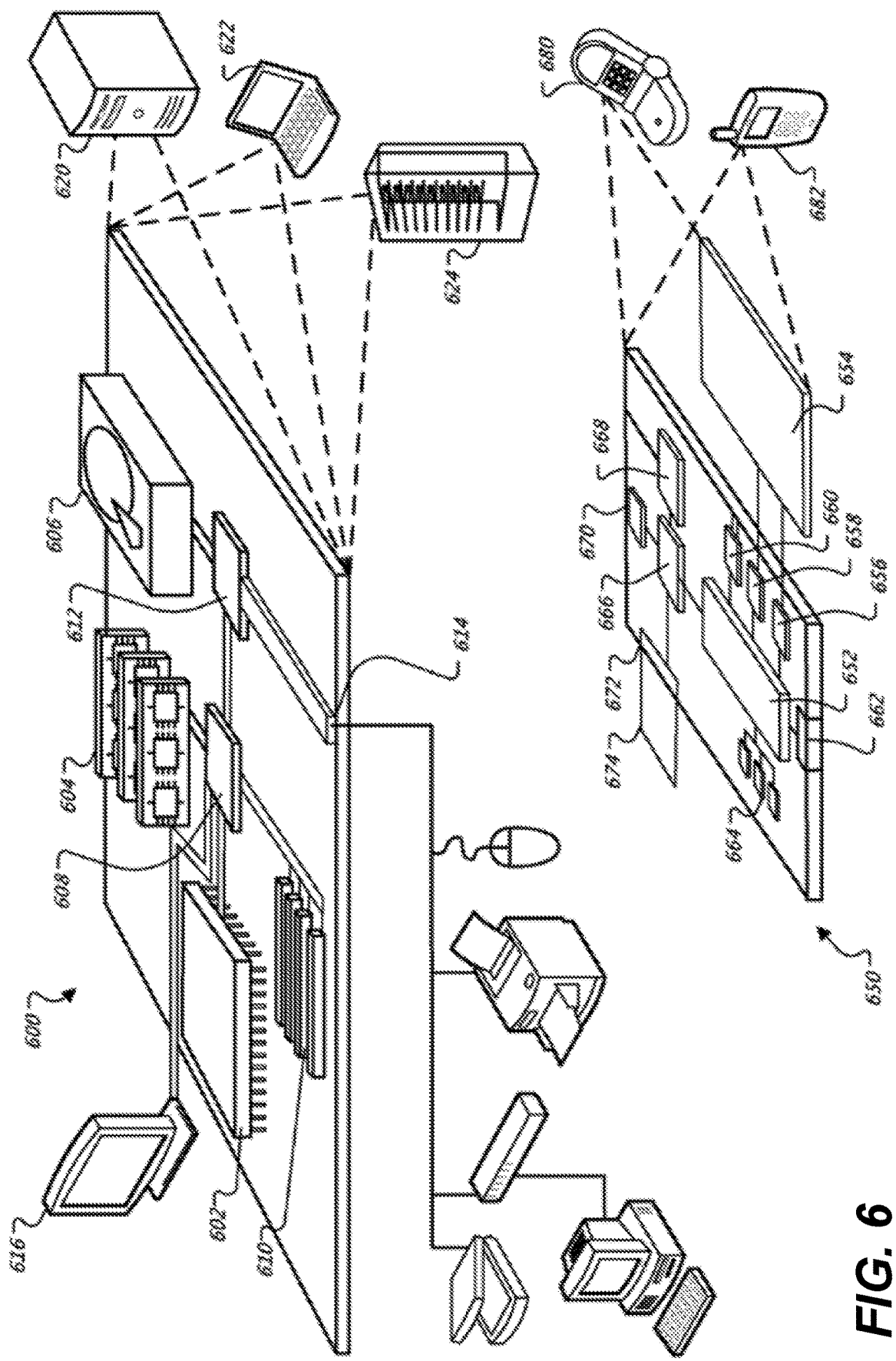
FIG. 6 shows an example of a computing device and a mobile computing device that may be used to implement systems and processes described in this document.

FIG. 6 is a block diagram of computing devices 600, 650 that may be used to implement the systems and processes described in this document, as either a client or as a server or plurality of servers. The computing device 600 is intended to represent various forms of digital computers, such as laptops, desktops, workstations, personal digital assistants, servers, blade servers, mainframes, and other appropriate computers. The computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

The computing device 600 includes a processor 602, memory 604, a storage device 606, a high-speed interface 608 connecting to the memory 604 and high-speed expansion ports 610, and a low speed interface 612 connecting to low speed bus 614 and the storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices 600 may be connected, with each device providing portions of the operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more processes, such as those described above. The information carrier is a computer- or machine-readable medium, such as the memory 604, the storage device 606, or memory on the processor 602.

The high-speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to the memory 604, the display 616 (e.g., through a graphics processor or accelerator), and to the high-speed expansion ports 610, which may accept various expansion cards (not shown). In the implementation, the low-speed controller 612 is coupled to the storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from the computing device 600 may be combined with other components in a mobile device, such as the computing device 650. Each of such devices may contain one or more of the computing device 600, 650, and an entire system may be made up of multiple computing devices 600, 650 communicating with each other.

The computing device 650 includes a processor 652, memory 664, an input/output device such as a display 654, a communication interface 666, and a transceiver 668, among other components. The computing device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the computing device 650, such as control of user interfaces, applications run by the computing device 650, and wireless communication by the computing device 650.

The processor 652 may communicate with a user through a control interface 658 and a display interface 656 coupled to the display 654. The display 654 may be, for example, a TFT (Thin-Film-Transistor Liquid Crystal Display) display or an OLEO (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with the processor 652, so as to enable near area communication of the computing device 650 with other devices. The external interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to the computing device 650 through an expansion interface 672, which may include, for example, a SIMM (Single In Line Memory Module) card interface. The expansion memory 674 may provide extra storage space for the computing device 650, or may also store applications or other information for the computing device 650. Specifically, the expansion memory 674 may include instructions to carry out or supplement the processes described above, and may include secure information also. Thus, for example, the expansion memory 674 may be provide as a security module for the computing device 650, and may be programmed with instructions that permit secure use of the computing device 650. In addition, secure applications may be provided via the SIMM cards, along with additional information, such as placing identifying information on the SIMM card in a non-hackable manner.

The memory may include, for example, flash memory and/or non-volatile random access memory (NVRAM) memory, as discussed below. In one implementation, a computer program product is tangibly embodied in an information carrier. The computer program product contains instructions that, when executed, perform one or more processes, such as those described above. The information carrier is a computer- or machine-readable medium, such as the memory 664, the expansion memory 674, or memory on the processor 652 that may be received, for example, over the transceiver 668 or the external interface 662.

The computing device 650 may communicate wirelessly through the communication interface 666, which may include digital signal processing circuitry. The communication interface 666 may provide for communications under various modes or protocols, such as Global System for Mobile Communications (GSM) voice calls, short message service (SMS), emergency medical services (EMS), or multimedia messaging service (MMS) messaging, code division multiple access (CDMA), time-division multiple access (TDMA), personal digital cellular (PDC), wideband CDMA (WCDMA), CDMA2000, or general packet radio service (GPRS), among others. Such communication may occur, for example, through the transceiver 668 (e.g., a radio-frequency transceiver). In addition, short-range communication may occur, such as using a Bluetooth® (a registered trademark of Bluetooth SIG Inc.), wireless fidelity (WiFi), or other such transceiver (not shown). In addition, a global positioning system (GPS) receiver module 670 may provide additional navigation- and location-related wireless data to the computing device 650, which may be used as appropriate by applications running on the computing device 650.

The computing device 650 may also communicate audibly using audio codec 660, which may receive spoken information from a user and convert it to usable digital information. The audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on the computing device 650.

The computing device 650 may be implemented in a number of different forms, as shown in the figure. For example, it may be implemented as a cellular telephone 680. It may also be implemented as part of a smartphone 682, personal digital assistant, or other similar mobile device. Additionally, the computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. "Machine-readable medium" is therefore distinguished from "computer-readable medium."

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and interact through a communication network. The relationship of client and server arises by virtue of computer programs running on the respective computers and having a client-server relationship to each other.

Although a few implementations have been described in detail above, other modifications are possible. Moreover, other mechanisms for performing the systems and processes described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A device comprising:
    a communication interface configured to communicate with a client device; and
    a processor configured to:
        identify a base topic of a personalized media stream;
        obtain first data from a first data service;
        obtain second data from a second data service, wherein the first data and the second data include data characterizing at least one of relationships between artists or relationships between media items;
        build a first collection of candidate media items using an automated media selection model that selects candidate media items from a media library without human intervention, wherein the automated media selection model selects the candidate media items based on the first data from the first data service indicating that a first media item is associated with the base topic;
        determine, based on a first-accuracy associated with the first data from the first data service relative to a second accuracy associated with the second data from the second data service, that the first collection of candidate media items is deficient;
        apply a media selection override in response to determining that the first collection of candidate media items is deficient, wherein applying a media selection override includes:
            building a second collection of candidate media items based on the second data from the second data service; and
            adjusting the automated media selection model to use the media selection override when building future collections of candidate media items; and
        initiate transmission, via the communication interface, of the second collection of candidate media items to the client device.

2. The device of claim 1, wherein building the first collection of candidate media items includes applying a weighting based on a first integrity value associated with the first data from the first data service.

3. The device of claim 1, wherein the processor is further configured to build the second collection of candidate media items to include second media items selected from a media library based on a determination that a second media item is associated with the base topic based on the second data from the second data service, wherein the second media item identified based on a similarity of the second media item to the base topic satisfying a similarity threshold.

4. The device of claim 3, wherein the first data service and the second data service are associated with different types of media categorization data, and wherein the media categorization data includes at least two of broadcast radio spin counts, acoustic analysis data, data derived from analysis of web pages, commercially-sourced media metadata, or data that indicates public user interaction with media-related entities.

5. The device of claim 1, wherein the processor is further configured to, subsequent to transmission of the second collection of candidate media items to the client device:
    identify a media item associated with the base topic based on third data from a third data service based on an integrity value associated with the third data service; and
    initiate transmission of the media item to the client device for playback.

6. The device of claim 5, wherein the processor is further configured to:
    generate a graphical user interface (GUI) including a similarity interface element and a display element that identifies at least one media item included in the second collection of media items;
    initiate transmission of the GUI, via the communications interface, to the client device; and receive, via the communications interface, a user update of the similarity interface element during playback of the at least one media item, the user update indicating a user selection of a similarity threshold.

7. The device of claim 1, wherein the device is further configured to:
build the first collection of candidate media items based on a level of influence of a particular type of media categorization data associated with the first data from the first data service.

8. The device of claim 1, wherein the device is further configured to:
order the second collection of candidate media items by changing an initial order of the second collection of candidate media items to place the candidate media items into regulatory or licensing compliance.

9. A method comprising:
obtaining first data from a first data service;
obtaining second data from a second data service, wherein the first data and the second data include data characterizing at least one of relationships between artists or relationships between media items;
generating, at a processing device including a processor and associated memory, a collection of candidate media items using an automated media selection model that selects candidate media items from a media library without human intervention, wherein the automated media selection model selects the candidate media items based on a based on the first data from the first data service indicating that a first media item is associated with a base topic;
determining, based on a first accuracy associated with the first data from the first data service relative to a second accuracy associated with the second data from the second data service, that the collection of candidate media items is deficient;
applying a media selection override in response to determining that the collection of candidate media items is deficient, wherein applying a media selection override includes:
building a second collection of candidate media items based on the second data from the second data service; and
adjusting the automated media selection model to use the media selection override when building future collections of candidate media items;
and
initiating transmission of the second collection of candidate media items to a client device.

10. The method of claim 9, further comprising:
generating, at the device, a graphical user interface (GUI) including a similarity interface element and a display element that identifies the first media item;
initiating transmission of the GUI to the client device; and
receiving, at the device from the client device, a user update of the similarity interface element during playback of the first media item, the user update indicating a user selection of a second similarity threshold.

11. The method of claim 9, wherein building the second collection of candidate media items further comprises biasing a play order of the second collection of candidate media items according to artist similarity to the base topic.

* * * * *